(12) United States Patent
Maekawa et al.

(10) Patent No.: US 8,657,453 B2
(45) Date of Patent: Feb. 25, 2014

(54) DISPLAY DEVICE

(75) Inventors: Satoshi Maekawa, Koganei (JP);
Takashi Sugiyama, Tokyo (JP)

(73) Assignees: Stanley Electric Co., Ltd., Tokyo (JP);
National Institute of Information and Communications Technology, Tokyo (JP)

( * ) Notice: Subject to any disclaimer, the term of this patent is extended or adjusted under 35 U.S.C. 154(b) by 49 days.

(21) Appl. No.: 13/319,805

(22) PCT Filed: May 10, 2010

(86) PCT No.: PCT/JP2010/057877
§ 371 (c)(1),
(2), (4) Date: Dec. 29, 2011

(87) PCT Pub. No.: WO2010/131623
PCT Pub. Date: Nov. 18, 2010

(65) Prior Publication Data
US 2012/0092766 A1 Apr. 19, 2012

(30) Foreign Application Priority Data

May 11, 2009 (JP) ................................. 2009-114648

(51) Int. Cl.
*G02B 5/12* (2006.01)
(52) U.S. Cl.
USPC ........................................................ 359/528
(58) Field of Classification Search
USPC .......................................... 359/528–530, 850
See application file for complete search history.

(56) References Cited

U.S. PATENT DOCUMENTS

| 7,154,675 | B2 | 12/2006 | Ishikawa et al. | |
|---|---|---|---|---|
| 2009/0310231 | A1* | 12/2009 | Maekawa | ...................... 359/850 |
| 2010/0128271 | A1 | 5/2010 | Maekawa | |
| 2010/0214394 | A1 | 8/2010 | Maekawa | |
| 2010/0231860 | A1 | 9/2010 | Maekawa | |

FOREIGN PATENT DOCUMENTS

| EP | 2 009 469 A1 | 12/2008 |
|---|---|---|
| JP | 2001-120404 A | 5/2001 |
| JP | 3097559 U | 8/2003 |
| JP | 2004-151645 A | 5/2004 |
| JP | 2007-072340 A | 3/2007 |

(Continued)

OTHER PUBLICATIONS

International Search Report dated Jun. 8, 2010 issued in International Appln. No. PCT/JP2010/057877.
Chinese Search Report dated Mar. 22, 2013 (and English translation thereof) in counterpart Chinese Application No. 201080025713.3.
Extended European Search Report (EESR) dated Sep. 19, 2012 (in English) issued in counterpart European Application No. 10774880.8.

(Continued)

*Primary Examiner* — Euncha Cherry
(74) *Attorney, Agent, or Firm* — Holtz, Holtz, Goodman & Chick

(57) ABSTRACT

A display device is capable of freely setting a viewing location for a real image formed by an imaging optical system of real specular image. The display device includes: an object of view; the imaging optical system having a semitransparent substrate with a plane of symmetry to define an object side space in which the object exists and a viewer side space in which a viewer exists, where the imaging optical system forms a real image of the object of view in the viewer side space with light passing through the substrate; and a reflective mirror arranged in the viewer side space so as to reflect light beams supplied from the imaging optical system to guide the reflected light beams toward the viewer.

6 Claims, 11 Drawing Sheets

(56) References Cited

FOREIGN PATENT DOCUMENTS

| WO | WO 2007/116639 A1 | 10/2007 |
| WO | WO 2008/075700 A1 | 6/2008 |
| WO | WO 2008/123473 A1 | 10/2008 |
| WO | WO2009/038173 A1 | 3/2009 |

OTHER PUBLICATIONS

Jearl Walker: "The Amateur Scientist"; Scientific American: vol. 254, No. 4, Apr. 1, 1986: pp. 112-117; XP001620838. (In English).
Satoshi Maekawa et al: "Transmissive Optical Imaging Device with Micromirror Array": Proceedings of SPIE: vol. 6392: Oct. 3, 2006: pp. 63920-1-63920-8: XP008130005. (In English).

* cited by examiner

DISPLAY DEVICE

This application is a U.S. National Phase Application under 35 USC 371 of International Application PCT/JP2010/057877 filed May 10, 2010.

TECHNICAL FIELD

The present invention relates to a display device for allowing a viewer to see a real image of an object of view formed in the air by using an imaging optical system of real specular image.

BACKGROUND ART

There has been suggested a display device in which a viewer is allowed to see a real image of an object of view, i.e., real specular image formed in the air by using an imaging optical system of real specular image (see Patent Literature 1).

This display device includes an object of view arranged in a space opposite to the viewer, and the imaging optical system of real specular image for forming a real image of the object of view in a space in which the viewer exists. A real image of the object is formed at a position symmetrical to the object with respect to a plane of symmetry (element surface) of the imaging optical system of real specular image.

PATENT LITERATURE

Patent Literature 1: WO2007/116639

DISCLOSURE OF THE INVENTION

Problem to be Solved by the Invention

Nevertheless, in case the method disclosed in Patent Literature 1 is applied to a display device, the imaging optical system of real specular image is still required behind a real image in order to see a real image. Accordingly, the viewing location of the viewer is limited to a position tilted 45 degrees from the element surface of the imaging optical system of real specular image.

Furthermore, the imaging optical system of real specular image can only form real images, meaning that an impressive image such as the one that is partially made stereoscopic cannot be formed.

In the method of Patent Literature 1, a resultant floating image is fixed in position and in size as an object of view is fixed. Accordingly, except for being a floating image, the resultant image is not impressive.

Thus, an object of the present invention is to provide a display device capable of freely setting a viewing location (angle) from which an image formed by an imaging optical system of real specular image is seen.

Means for Solving the Problem

A display device of the present invention is characterized by comprising: an object of view; an imaging optical system of real specular image including a semitransparent substrate with a plane of symmetry to define an object side space in which the object exists and a viewer side space in which a viewer exists, where the imaging optical system of real specular image forms a real image of the object of view in the viewer side space with light passing through the substrate; and a reflective mirror arranged in the viewer side space so as to reflect light beams supplied from the imaging optical system of real specular image to guide the reflected light beams toward the viewer.

In the present invention, light beams from the imaging optical system of real specular image are caused to turn back by the reflective mirror arranged in the viewer side space, and are then guided toward the viewer. Accordingly, a viewing location (angle) from which an image is seen is freely set.

Furthermore, if the reflective mirror is arranged to cross a real image, i.e., real specular image in the present invention, then resultant images are seen as an image sticking out of the surface of the reflective mirror with part thereof formed as a real image and other part thereof formed as a virtual image. In this case, a very impressive image to be seen is formed by the present invention.

The present invention is structured to have the reflective mirror, but a viewer immediately sees it. Nevertheless the reflective mirror may be adorned with a frame pattern, under-layer pattern or the like printed, so that the present invention enables to display double images such as the frame pattern and a floating image. Such a structure to look like a weak point at a glance is used in the present invention, but it can be provided with a characteristic exhibition favorably.

In addition, the present invention further may be configured to have a mechanism for moving the object of view along a straight line connecting the object of view and the imaging optical system of real specular image to change the position of image the position. Accordingly, an image to be formed by the reflective mirror may gradually be changed from a completely virtual image to a completely real image, thereby making an image to be seen more impressive. Further if such a mechanism is combined with the foregoing printed frame pattern, under-layer pattern or the like, then the present invention enables to realize the observation image which seems to pierce through the printed frame while moving from the far side to the near side alternatively from the near side to the far side for the viewer.

In order to move the object of view, a method or means to mechanically move the object attached to a guide rail by using the operation of a motor and the like may be applicable. In addition, compact light sources such as LEDs may also be arranged in line to control a place of light emission.

In the present invention, the imaging optical system of real specular image is configured such that it allows areal image of the object to be seen from a viewing location tilted from the plane of symmetry (substrate). A specific example of the imaging optical system of real specular image is the one with a dihedral corner reflector array. The dihedral corner reflector array is constructed of a number of dihedral corner reflectors arranged two-dimensionally each having two orthogonal mirror surfaces. A common flat surface orthogonal to all mirror surfaces is defined as an element surface with respect to which the object and a real image are symmetrical to each other. Each light beam emitted from the object is reflected once by each of the two mirror surfaces of each of the dihedral corner reflectors. Each reflected light beam is then caused to pass through the element surface of the dihedral corner reflector array. As a result, a real image of the object is formed at a position symmetrical to the object with respect to the element surface of the dihedral corner reflector array.

In order to suitably bend each light beam by each of the dihedral corner reflectors and allows the light beam to pass through the element surface, inner walls of optical holes defined in a direction in which the holes penetrate the element surface are used as respective mirror surfaces of the dihedral corner reflectors of the dihedral corner reflector array. These dihedral corner reflectors are described conceptually, and are not required to reflect a shape determined, for example, by physical boundaries. As an example, the optical holes may not be separated, but may be coupled to each other.

In simple terms, the dihedral corner reflector array is constructed of a large number of mirror surfaces substantially orthogonal to the element surface and arranged on the element surface. What should be taken into account in terms of structure is how the mirror surfaces are fixedly supported on the element surface. As an exemplary specific way of forming the mirror surfaces, a substrate for defining predetermined spaces is provided to have a plane in which the dihedral corner reflector array is arranged as an element surface and then inner walls of each optical hole are used as mirror surfaces of each of the dihedral corner reflectors where the optical holes are made so as to penetrate the element surface. The holes formed in the substrate are only required to be transparent for allowing respective light beams to pass therethrough. By way of example, the holes may be evacuated. Alternatively, the holes may be filled with transparent gas or transparent liquid. The shape of each hole may arbitrarily be determined, as long as the holes each have one mirror surface on its inner wall functioning as a unit optical element, or two or more of such mirror surfaces not existing on the same plane, and each light beam reflected by the mirror surface is allowed to pass through the corresponding hole. The holes may be coupled, or may be of complicated structures as a result of their partial losses. As another example, different independent mirror surfaces stand together in large numbers on a surface of a substrate. In this case, it is understood that holes formed in the substrate are coupled to each other.

Further, the dihedral corner reflectors may be formed using a solid substance such as transparent glass or resin to have a prism or cylindrical shape as the optical hole. In the case where each cylindrical member is formed from a solid substance, the cylindrical members may be arranged close to each other to function as a support member of the elements. Also, if the dihedral corner reflector array has a substrate, the cylindrical members may project from a surface of the substrate. The shape of the cylindrical members may also arbitrarily be determined, as long as the cylindrical members each have one mirror surface on its inner wall, or two or more of such mirror surfaces not existing on the same plane that allow the cylindrical member to function as a dihedral corner reflector, and each light beam reflected by the mirror surface is allowed to pass therethrough. Although called cylindrical members, they may be coupled, or may be of a complicated structure as a result of their partial losses.

A shape of the optical hole should be considered, wherein all of the adjacent inner wall surfaces are orthogonal, as in a cube or a rectangular parallelepiped. In such a case, the gaps between adjacent dihedral corner reflectors can be minimized, and thereby highly dense arrangements are possible. It is preferable that reflection be prevented by a surface other than that of a dihedral corner reflector that faces an object of view.

In the case where a dihedral corner reflector has a plurality of inner mirror surfaces, some of the transmitted light may undergo multiple reflections, i.e., there may occur multiple reflections of light beams passing through the hole several times or more than that of assumed reflections. Regarding countermeasures for these multiple reflections, if two mutually orthogonal mirror surfaces are formed on the inner wall of an optical hole, such multiple reflections is prevented in the following ways. In one way, a surface other than these two mirror surfaces may be made non-specular to prevent reflection of light beams by this surface. In another way, a surface other than these mirror surfaces may be tilted from an element surface so that it may not orthogonal to the element surface, or may be curved. In either way, generation of the multiply reflected light beam reflected three times or more may be reduced, or prevented. In order to form a non-specular surface, the following configuration may be used in which a target surface may be coated with an anti-reflection coating or a thin film and, alternatively, the surface roughness of the target surface may be increased to cause diffuse reflection on the target surface. In addition, the existence of a transparent and flat substrate does not obstruct the functions of the optical element, and therefore any appropriate substrate may be used as a supporting member and/or a protective member.

In order to enhance the brightness level of a real image to be projected, it is desirable that a number of dihedral corner reflectors arranged on an element surface are as close as possible to each other. As an example, lattice arrangement of the dihedral corner reflectors is effective. Such an arrangement makes it easy to manufacture a display device, as a merit. A mirror surface of each dihedral corner reflector may be a flat surface for causing reflection of light beams, and which is made of a lustrous substance such as metal or resin, regardless of whether the substance is solid or liquid. A mirror surface of a dihedral corner reflector may also be such that it causes reflection or total reflection at a flat boundary interface between transparent media of different refractive indexes. In the case where a total internal reflection is used for the mirror surface, it is highly likely that the undesirable multiple reflections by the plurality of multiple mirror surfaces will exceed the critical angle of the total internal reflection, and therefore it is expected that these undesirable multiple reflections will naturally be suppressed. Additionally, the mirror surface may either be formed only on a limited part of the inner wall of an optical hole, or may be constructed of a plurality of unit mirror surfaces arranged in parallel, as long as each mirror surface serves its function without problems. Regarding the latter aspect, in other words, the formation of a mirror surface from unit mirror surfaces means that a mirror surface may be divided into a plurality of unit mirror surfaces. In this case, the unit mirror surfaces are not necessarily required to exist on the same plane, but are parallel. Furthermore, the unit mirror surfaces may be contact with each other, or may be spaced from each other.

Another specific example applicable in the present invention as an imaging optical system of real specular image is an optical system including a retroreflector array for causing retroreflection of light beams, and a half mirror with a half mirror surface for reflecting light beams and causing the light beams to pass therethrough. In this imaging optical system of real specular image, the half mirror surface functions as a plane of symmetry, and the retroreflector array is arranged at a position that can cause retroreflection of light beams emitted from an object of view, and reflected by or passing through the half mirror. The retroreflector array is arranged only in the same space in which an object of view also exists with respect to the half mirror. The position of the retroreflector array is such that light beams reflected by the half mirror are retroreflected by the retroreflector array. Herein "Retroreflection", that is the operation of a retroreflector, is a phenomenon in which each reflected light beam is reflected back to where it originated (or reversely reflected), thus the incoming light beam and the reflected light beam are parallel to each other and in opposite directions. A number of retroreflectors are arrayed to constitute the retroreflector array. If each of the retroreflectors is sufficiently small in size, paths of an incoming light beam and a reflected light beam are considered to overlap. The retroreflectors of the retroreflector array are not required to be on a plane surface, but may be on a curved surface. Furthermore, these retroreflectors are not required to be on the same plane, but may be scattered three-dimensionally. In addition, the half mirror has two functions to cause light beams to pass therethrough and to reflect light beams. A ratio between the transmittance and the reflectivity of the half mirror is ideally 1:1.

There may be utilized a retroreflector constructed of three adjacent mirror surfaces (called a "corner reflector" in a broad sense). Alternatively, a cat's eye retroreflector may be used as the retroreflector. As an example, a corner reflector is constructed of three mirror surfaces orthogonal to each other. As another example, the corner reflector has three adjacent mirror surfaces, where two of angles defined by the mirror surfaces are both 90 degrees, and the other angle is 90/N (where N is an integer) degrees. As still another example, the corner reflector is also an acute angle retroreflector with three mirror surfaces, where angles defined by three mirror surfaces are 90 degrees, 60 degrees and 45 degrees respectively.

If the imaging optical system of real specular image including the aforementioned retroreflector array and the half mirror is used, some light beams emitted from an object of view are reflected by the half mirror surface. Then, the reflected light is retro-reflected by the retroreflector array to return to where it originated in all cases, and then passes through the half mirror surface. As a result, an image of the object is formed. Accordingly, as long as the retroreflector array is placed at a position that allows receipt of reflected light beams from the half mirror, the shape and the position of the retroreflector array are not limited. A real image thereby formed is seen in a direction opposite to light beams passing through the half mirror surface.

An example of an object of view is an indication fixedly displayed such as a neon sign, or that fixedly displayed on a display panel (such as an emergency lamp constructed of a light source and a display panel). Another example of an object of view is an image displayed on a display surface of an electronic display such as a liquid crystal display, a CRT display and an organic EL display. Still another example of an object of view is an array light source given by arranging compact light sources such as LEDs in line and controlling a place of light emission.

Advantageous Effect

According to the present invention, there is realized a display device capable of freely setting a viewing location (angle) from which an image is seen by a viewer, because light beams from the imaging optical system of real specular image are caused to turn back by the reflective mirror arranged in the viewer side space, and are then guided toward the viewer in the present invention. Furthermore, according to the present invention, there is realized a display device capable of forming a very impressive image to be seen by a viewer, because the reflective mirror is arranged to cross a real image, i.e., real specular image so that resultant images are seen as an image sticking out of the surface of the reflective mirror with part thereof formed as a real image and other part thereof formed as a virtual image. In addition, the utilizations of the reflective mirror having at least one pattern of an under-layer pattern and a frame pattern printed and/or the mechanism for moving the object of view along a line for connecting the object of view and the imaging optical system of real specular image.

BRIEF DESCRIPTION OF THE DRAWINGS

The aforementioned aspects and other features of the present invention are explained in the following description, taken in connection with the accompanying drawing figures wherein.

DETAILED DESCRIPTION OF THE INVENTION

Figure 1:
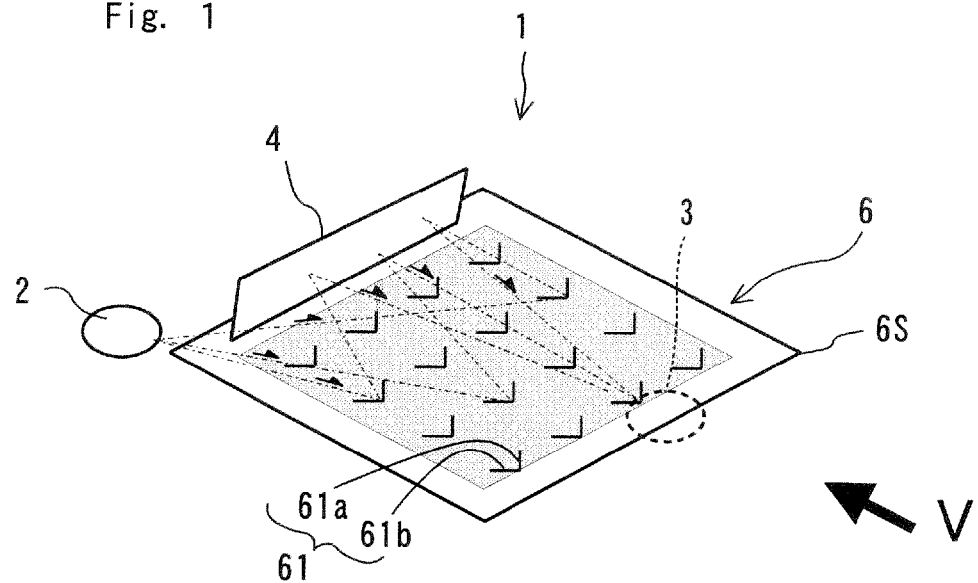
FIG. 1 is a schematic perspective view illustrating a display device of an embodiment of the present invention when viewed from a viewer.

A display device of an embodiment according to the present invention will be described herein below by referring to the drawings.

Figure 2:
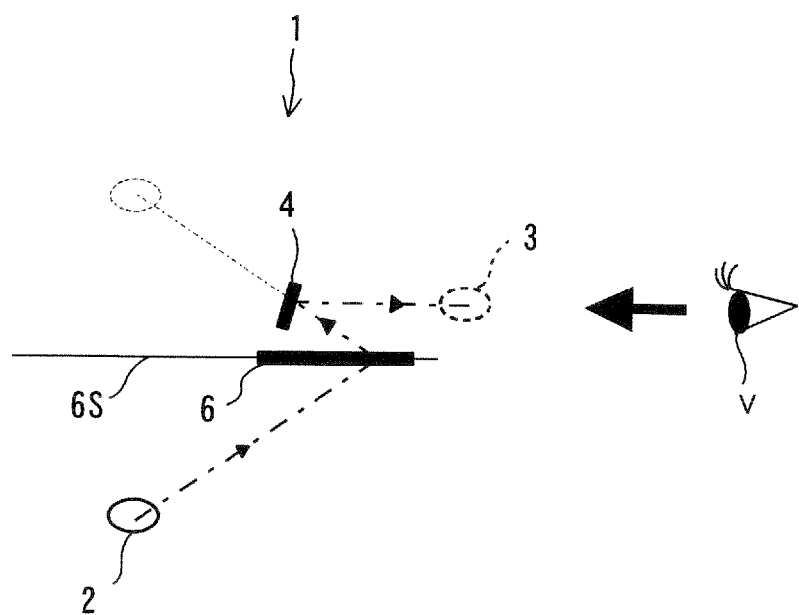
FIG. 2 is a schematic cross-sectional side view illustrating a principal part of the display device of the embodiment when viewed from a side thereof.

FIGS. 1 and 2 are explanatory drawings each showing a device structure to which the present invention is adapted to have a single reflective mirror. A display device 1 includes a dihedral corner reflector array 6 as an imaging optical system of real specular image; and an object of view 2 arranged in a space opposite to a viewer V with respect to the dihedral corner reflector array 6; and furthermore, a reflective mirror 4 arranged in a space where the viewer V exists with respect to the dihedral corner reflector array 6. Light beams emitted from the object of view 2 pass through the dihedral corner reflector array 6 while being reflected twice at the dihedral corner reflector array 6, and then reflected by the reflective mirror 4, so that the floating image 3 as a real specular image is formed on the line of sight of the viewer V. Further, the reflective mirror 4 is set with a proper angle with respect to the dihedral corner reflector array to guide the light beams passing through the dihedral corner reflector array 6 toward the viewer V. Namely, the object of view 2, the dihedral corner reflector array 6 and the reflective mirror 4 are arranged in such a manner that light beams emitted from the object of view 2 are reflected by the dihedral corner reflector array 6 and then introduced to the reflective mirror 4.

In order to explain the foregoing element relationship in detail, first of all a single unit of the dihedral corner reflector array is described in configuration and effect, and then a combination of adding a reflective mirror 4 thereto is described in configuration and effect.

Figure 3:
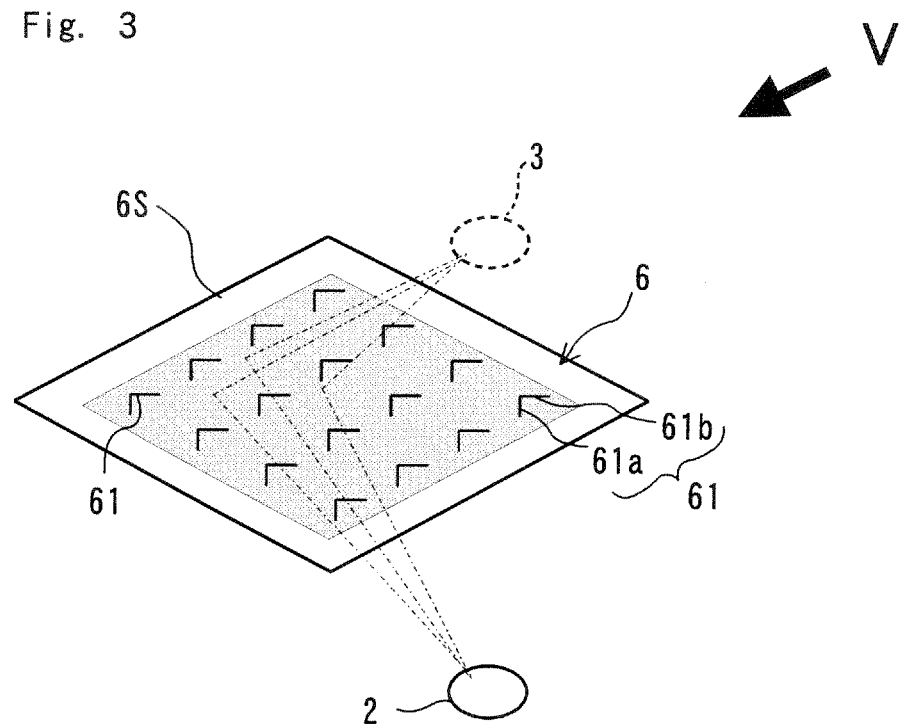
FIG. 3 is a schematic perspective view illustrating how an image is formed only by a dihedral corner reflector array applied to the embodiment.
Figure 4A:
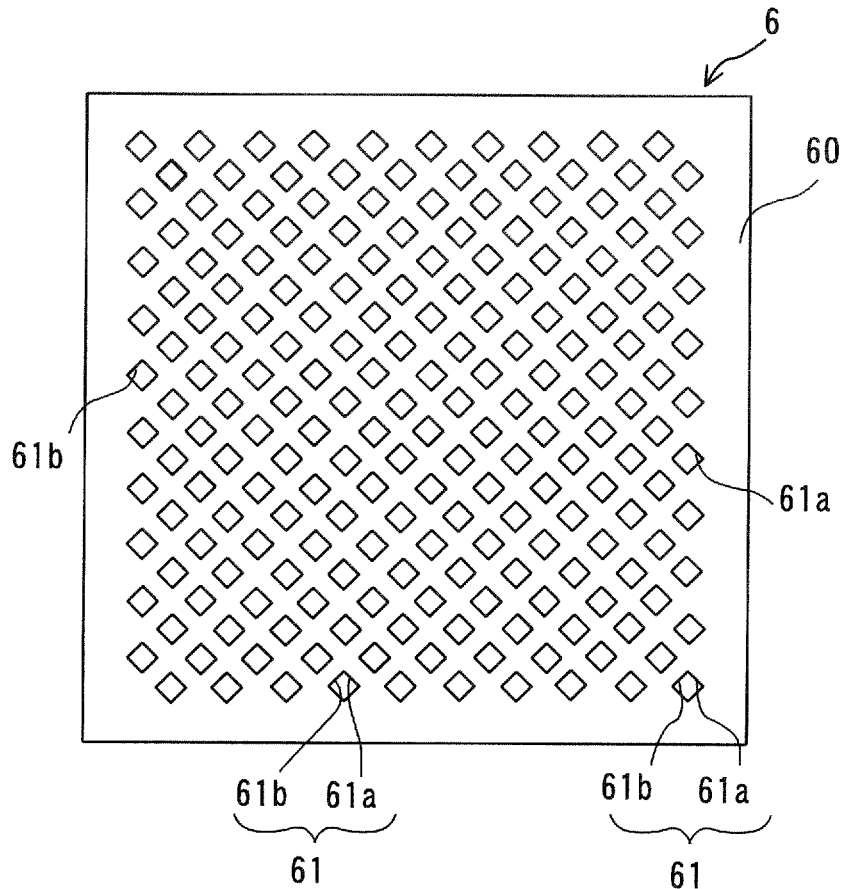
FIG. 4A is a schematic plan view illustrating a specific example of the structure of the dihedral corner reflector array applied to the display device of the embodiment.
Figure 4B:
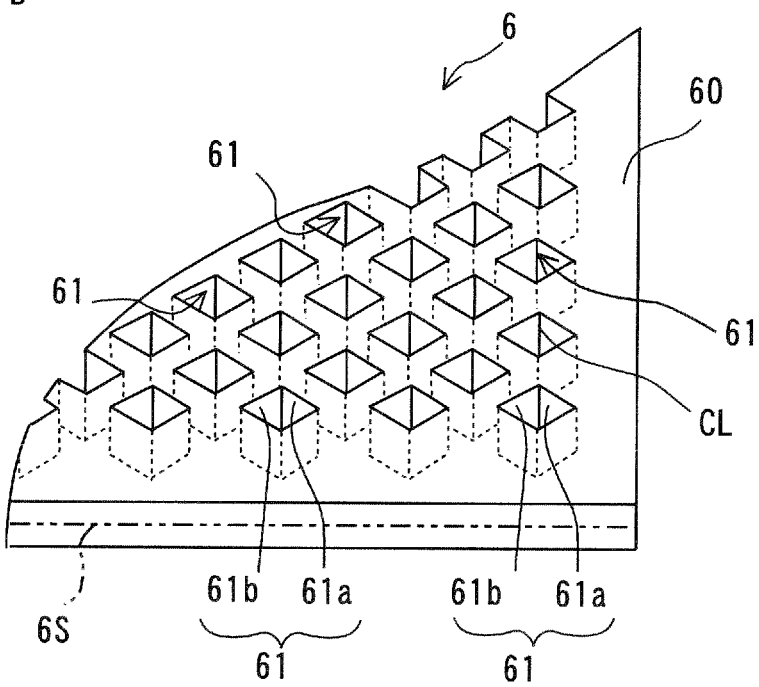
FIG. 4B is a schematic partial cutaway perspective view respectively illustrating a specific example of the structure of the dihedral corner reflector array applied to the display device of the embodiment.

As is schematically shown in FIGS. 3, 4A and 4B, the dihedral corner reflector array 6 is constructed of a large number of dihedral corner reflectors 61 each having two orthogonal mirror surfaces 61a and 61b. A flat surface substantially orthogonal to the two mirror surfaces 61a and 61b of each of the dihedral corner reflectors 61 is defined as an element surface 6S. The real image 3 of the object of view 2 is formed at a position plane-symmetrical to the object of view 2 with respect to the element surface 6S. In the present embodiment, the dihedral corner reflectors 61 are considerably small (on the order of micrometers) compared to the entire size (on the order of centimeters) of the dihedral corner reflector array 6. In FIG. 3, an aggregate of the dihedral corner reflectors 61 is shown in gray and a dihedral angle defined by the mirror surfaces are indicated by V shapes as showing an orientation of the interior corners thereof, so that the dihedral corner reflectors 61 are exaggeratedly shown in the figure. FIG. 4A is a schematic plan view of the dihedral corner reflector array 6, and FIG. 4B is a perspective view of part of the dihedral corner reflector array 6. In FIGS. 4A and 4B, the dihedral corner reflectors 61 and the mirror surfaces 61a, 61b are shown to be quite exaggerated in comparison to the entirety of the dihedral corner reflector array 6.

For the dihedral corner reflector array 6 to bend each light beam and allow the light beam to pass therethrough, a following optical element may be used, in which a large number of physical and optical holes are formed in the flat surface of a flat plate substrate 60 in such a manner that the holes vertically penetrate the substrate 60 in the thickness direction wherein two orthogonal ones of the inner wall surfaces of every hole is formed as mirror surfaces 61a and 61b in order to use the inner wall surfaces of each hole to function as the dihedral corner reflector 61. To provide the substrate 60 at least with a semi-transmitting property, as shown in FIGS. 4A and 4B, a large number of physical and optical holes (one side of which ranges from 50 μm to 200 μm, for example) substantially rectangular (square, for example) in plan view for allowing each light beam to pass therethrough are formed in the thin flat plate substrate 60. Then, the mirror surfaces 61a and 61b are formed by smoothing and mirror finishing of two orthogonal and adjacent ones of the inner wall surfaces of each hole. As a result, the dihedral corner reflectors 61 each have the two mirror surfaces 61a and 61b functioning as reflective surfaces are provided. It is preferable that some of the inner wall surfaces of the holes that are not to form the dihedral corner reflectors 61 be subjected to no mirror finishing so that they will be made non-reflective, or be angled so that they will produce no multiply reflected light beams. It is also preferable that the dihedral corner reflectors 61 be arranged on regularly aligned lattice points so that the internal angles defined by the mirror surfaces 61a and 61b will be all positioned in the same direction on the substrate 60. Accordingly, a line of intersection CL of the two orthogonal mirror surfaces 61a and 61b of each of the dihedral corner reflectors 61 is preferably orthogonal to the element surface 6S. In the below, the direction of the internal angle defined by the mirror surfaces 61a and 61b is called the orientation (direction) of the dihedral corner reflector 61.

Exemplary formation of the mirror surfaces 61a and 61b is as follows. A metallic mold is prepared first. Then, a process such as a nanoscale cutting process, a nanoimprint process that is a nanoscale press process using a mold, or electroforming is performed on the inner wall surfaces so that the inner wall surfaces function as the mirror surfaces 61a and 61b. The mirror surfaces 61a and 61b thereby formed are processed such that their surface roughness is equal to, or less than, 10 nm, and that they uniformly function as mirror surfaces in a visible light spectral range. When the substrate 60 is formed by electroforming with metal such as aluminum or nickel, the mirror surfaces 61a and 61b become natural mirror surfaces if the surface roughness of the mold is sufficiently small. When a nanoimprint process is used to apply resin and the like as a material of the substrate 60, mirror coating should be performed by a process such as sputtering to form the mirror surfaces 61a and 61b. Transmittance of light is enhanced by controlling a space between adjacent ones of the dihedral corner reflectors 61 to its minimum possible level. It is preferable that the upper surface (surface viewed from a viewer) of the dihedral corner reflector array 6 be subjected to a process such as coating with a low reflective material. The structure of the dihedral corner reflector array 6 is not limited to those described above. The structure of the dihedral corner reflector array 6 and a method of forming the same may suitably be employed, as long as a large number of dihedral corner reflectors 61 are each formed by the two orthogonal mirror surfaces 61a and 61b, and the dihedral corner reflectors 61 each function as an optical hole for allowing each light beam to pass therethrough.

In each of the dihedral corner reflectors 61 constituting the dihedral corner reflector array 6, light beams entering the corresponding hole via the rear side are reflected by one mirror surface 61a (or 61b). The reflected light beam is further reflected by the other mirror surface 61b (or 61a), and is then caused to pass through the dihedral corner reflector 61 via the front side. A path along which each light beam enters the dihedral corner reflector 61 and a path along which the light beam exits the dihedral corner reflector 61 are plane-symmetrical to each other with respect to the element surface 6S. Specifically, assuming that the element surface 6S is a surface passing the central portion of the height of each mirror surface and orthogonal to each mirror surface, the element surface 6S is a plane of symmetry with respect to which the position of the real image formed as a floating image, i.e., real specular image 3 of the object of view 2 is plane-symmetrical to the object of view 2.

Briefly described next together with a path of each light beam emitted from a point light source (o) as an object of view is how an image is formed by the dihedral corner reflector array 6.

Figure 5:
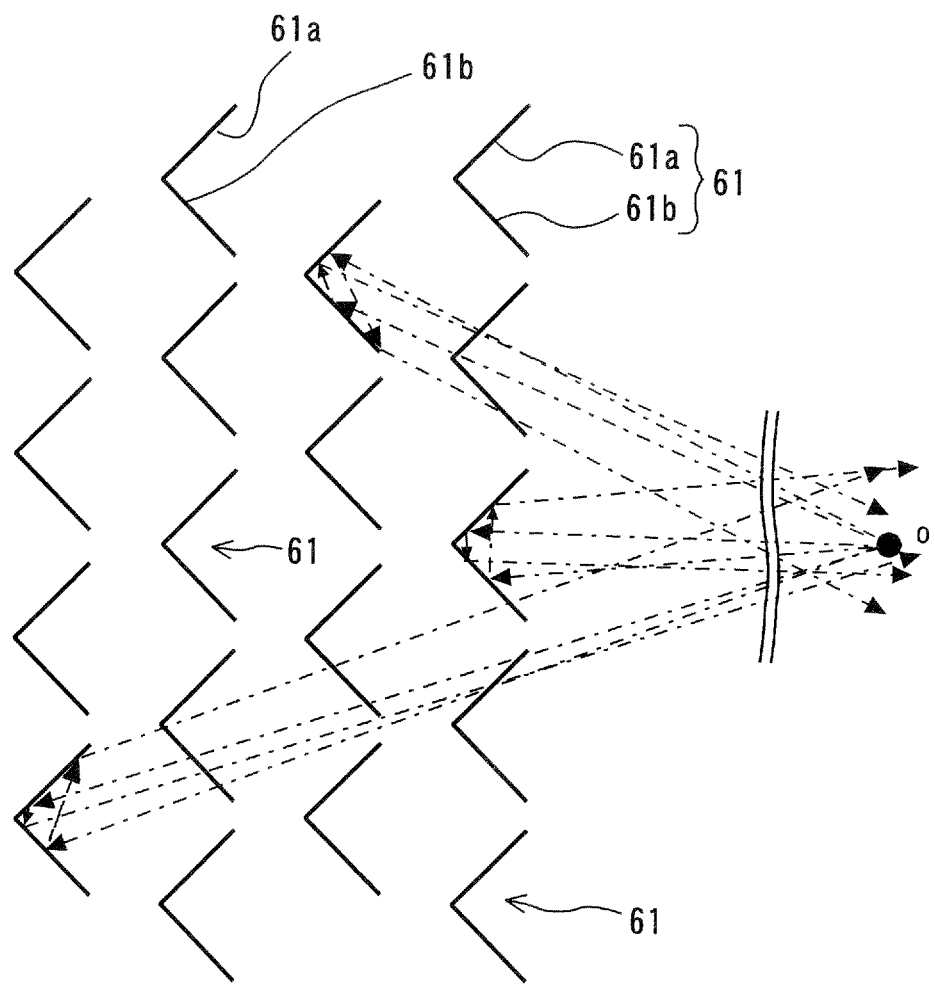
FIG. 5 is a schematic plan view illustrating how an image is formed by the dihedral corner reflector array applied to the display device of the embodiment.
Figure 6:
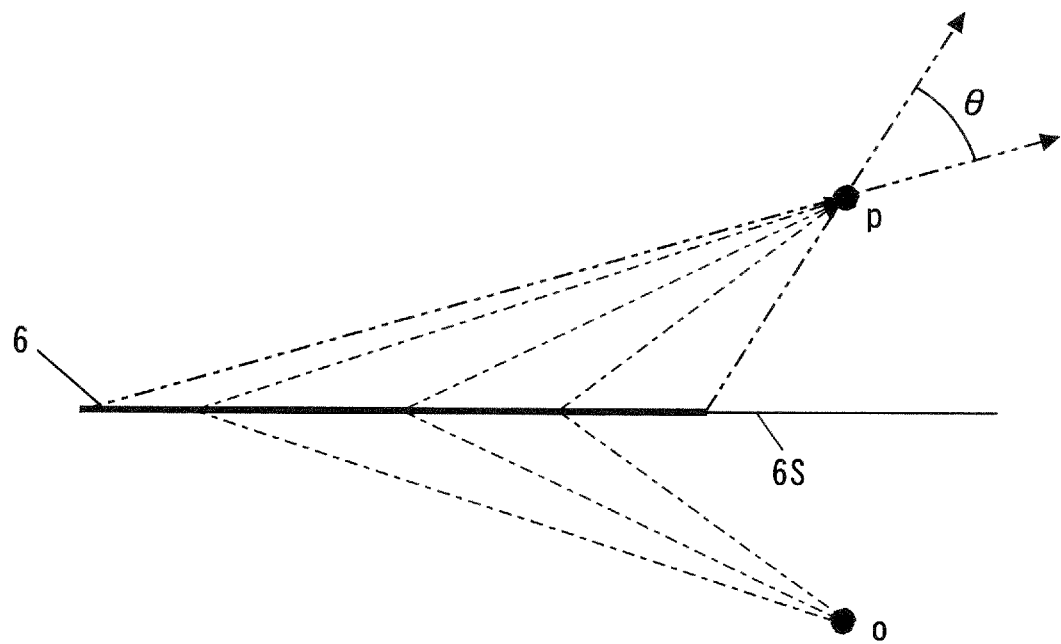
FIG. 6 is a schematic side view illustrating how an image is formed by the dihedral corner reflector array applied to the display device of the embodiment.

As is schematically shown in the plan view of FIG. 5 and in the side view of FIG. 6, when passing through the dihedral corner reflector array 6, light beams emitted from the point light source (o) (indicated by one-dot arrowed chain lines traveling from the back toward the front on the drawing when viewed three-dimensionally in FIG. 5) are each reflected once by one mirror surface 61*a* (or 61*b*), and is reflected further by the other mirror surface 61*b* (or 61*a*) of each of the dihedral corner reflectors 61. Next, the reflected light beams pass through the element surface (6S in FIG. 6), and then pass in dispersion a point that is plane-symmetrical to the point light source (o) with respect to the element surface 6S of the dihedral corner reflector array 6. Incoming light beams and reflected light beams are shown to be parallel in FIG. 5. The reason therefor is as follows. In FIG. 5, the dihedral corner reflectors 61 are shown to be exaggeratedly large in comparison to the point light source (o). However, the actual size of the dihedral corner reflectors 61 is considerably small. Accordingly, incoming light beams and reflected light beams nearly overlap each other when the dihedral corner reflector array 6 is viewed from above. In summary, light beams converge to a position plane-symmetrical to the point light source (o) with respect to the element surface 6S, so that a real image is formed at a position (p) shown in FIG. 6.

FIG. 6 shows optical paths along which light beams emitted from an object of view travel through the dihedral corner reflector array 6 to reach a space of the position (p) plane-symmetrical to the object with respect to the element surface 6S, so that a real specular image is formed at the space. Two paths indicated by the two-dot chain lines are optical paths passing through opposite edge surfaces of the dihedral corner reflector array 6 (front and back edge surfaces when viewed from the viewer V). Since the dihedral corner reflector array 6 should exist behind a real image formed at the position (p), a real image can be viewed from the viewer within an angular range (angle θ) defined by these two two-dot chain lines. Conversely, a real image cannot be viewed if it is out of this range.

Figure 7:
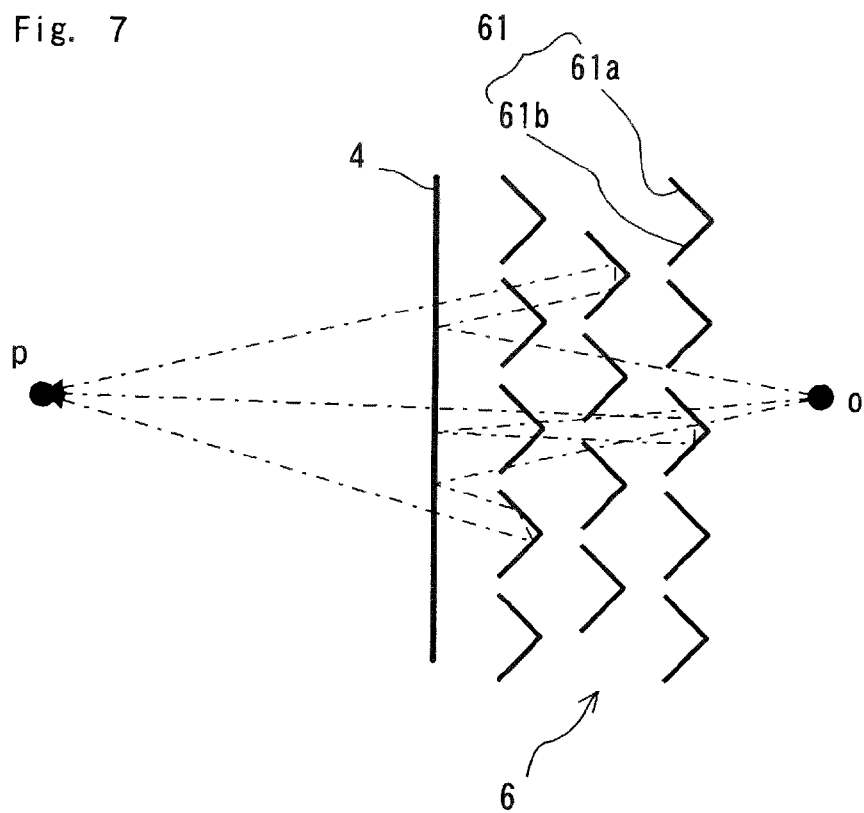
FIG. 7 is a schematic plan view illustrating how an image is formed by combination of a half mirror with the dihedral corner reflector array applied to the display device of the embodiment.
Figure 8:
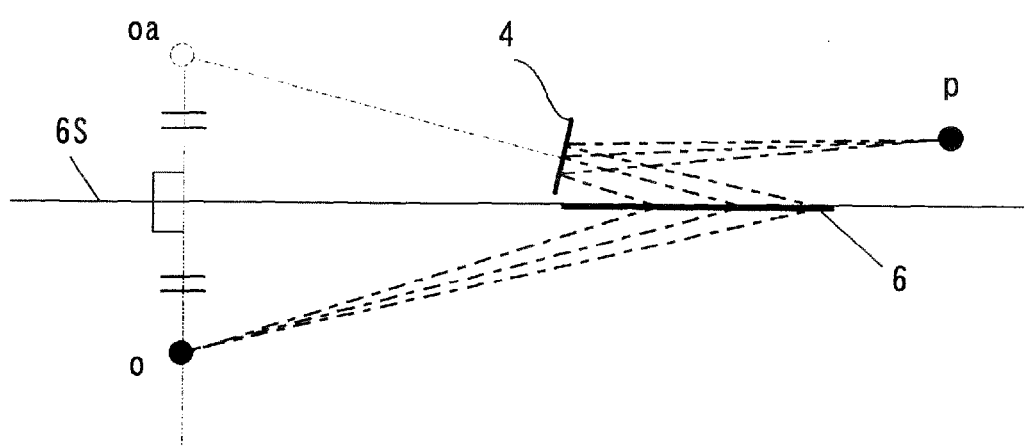
FIG. 8 is a schematic side view illustrating how an image is formed by combination of the half mirror with the dihedral corner reflector array applied to the display device of the embodiment.

FIGS. 7 and 8 respectively corresponding to FIGS. 5 and 6 explain the operation realized by adding a reflective mirror 4 in the space in which the viewer exists. Although FIG. 5 shows paths of light beams that first fall on both of the two mirror surfaces (61*a*, 61*b*) of each of the dihedral corner reflectors 61 are shown (namely, two paths are shown), but in FIG. 7, only one light beam that first falls on either of the mirror surfaces is shown in order to avoid complication. A basic concept is as follows. As shown in FIGS. 7 and 8, each light beam emitted from the point light source (o) first passes through one of the dihedral corner reflectors 61 after being reflected twice at the dihedral corner reflector 61. The reflected light beam is then caused to turn back by the reflective mirror 4 of planar mirror arranged on the path of the light beam traveling toward the viewer V. As a result, a real image is formed at the position (p). In other words, light beams emitted from the point light source (o) are reflected by the reflective mirror 4, before being condensed to a position (oa) plane-symmetrical to the point light source (o) with respect to the element surface 6S, so that a real specular image is formed at a position (p) plane-symmetrical to the position (oa) with respect to the reflective mirror 4. In case that the reflective mirror 4 is seen from the side of the dihedral corner reflector array 6, the object (a real specular image at (p) in FIGS. 7 and 8) is observed, a virtual image at the position (oa) (corresponding to a real specular image at the position (p) in FIGS. 5 and 6) is observed although not directly seen. The arrangement of the reflective mirror 4 (i.e., an angle with respect to the dihedral corner reflector array 6) in FIG. 8 is set as an exemplary one in such a manner that the light beams are condensed almost horizontally to (p) (i.e., almost parallel to the element surface of the dihedral corner reflector array) so that the real specular image can be observed horizontally. But not limited by this, the tilt angle of the reflective mirror may be changed to increase the variation of observing directions.

In FIGS. 1 and 2, the combination of adding a reflective mirror 4 to the dihedral corner reflector array of FIG. 3 is drawn as the present embodiment showing the relationship of the dihedral corner reflector array 6, the reflective mirror 4 and the object of view 2. As seen from the foregoing description, a real specular image 3 is formed in a space between the reflective mirror 4 and the viewer V as a real specular image 3 floating in a line of sight of the viewer V in the air.

As described above, the present embodiment enables to display the floating real specular image 3 in a line of sight of the viewer V in the air, and besides, enables to realize observation of the real specular image 3 in the various directions including a direction of almost parallel to the dihedral corner reflector array 6 by adjustment of the added arrangement of the reflective mirror 4 (angle).

Figure 9:
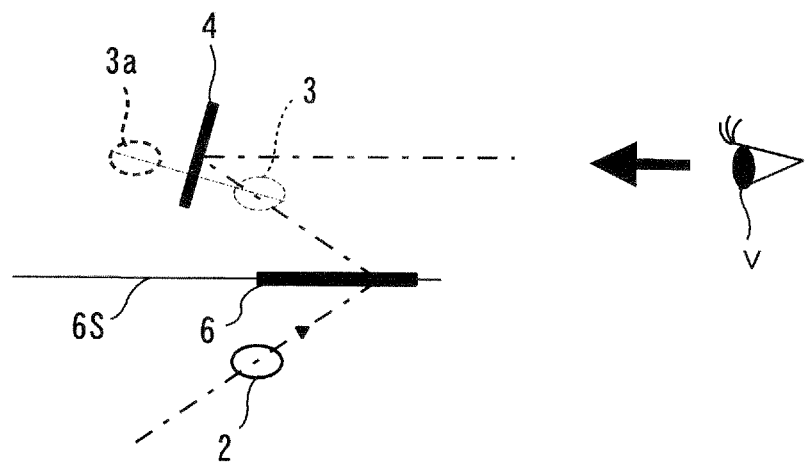
FIG. 9 is a schematic cross-sectional side view illustrating a principal part of a display device of another embodiment according to the present invention when viewed from a side.
Figure 10:
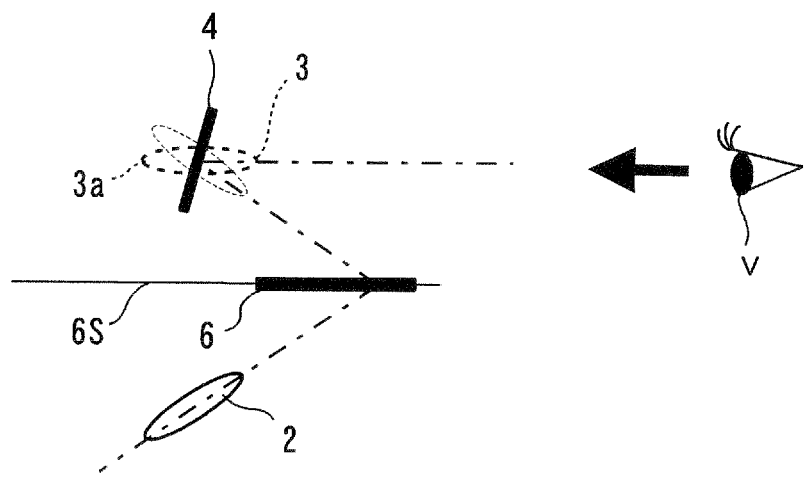
FIG. 10 is a schematic cross-sectional side view illustrating a principal part of a display device of another embodiment according to the present invention when viewed from a side.
Figure 11:
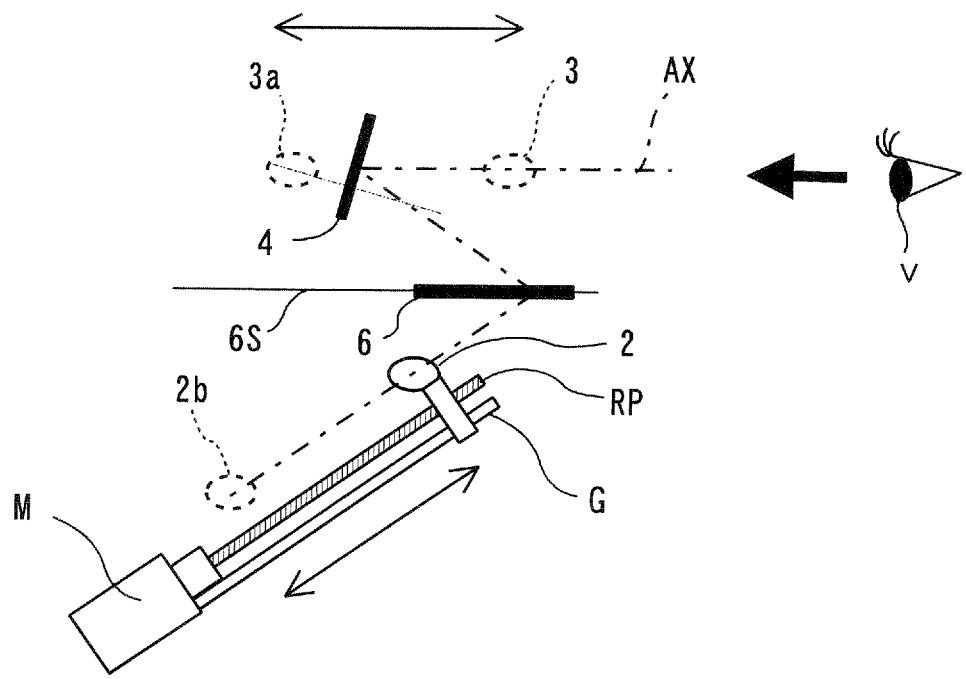
FIG. 11 is a schematic cross-sectional side view illustrating a principal part of a display device of another embodiment according to the present invention when viewed from a side.

FIGS. 9, 10 and 11 are schematic cross-sectional side views each illustrating a principal part of a display device of another embodiment to which the present invention is adapted.

Although the real specular image 3 is formed in a space between the reflective mirror 4 and the viewer V in FIGS. 1 and 2, and referring to FIG. 9, a further exemplary embodiment displays a real specular image 3 in a space of between the dihedral corner reflector array 6 and the reflective mirror 4. In this case, the viewer can see a virtual image 3*a* of a real specular image 3 caused by reflection the reflective mirror 4.

As shown in FIG. 9, each light beam emitted from the object of view 2 passes through the dihedral corner reflector array 6 while being reflected twice by the dihedral corner reflector array 6. Then, a real image of the object of view 2 is formed as the floating real image, i.e., real specular image 3 at a position (between the viewer V and the reflective mirror 4) symmetrical to the object of view 2 with respect to the dihedral corner reflector array 6. The viewer V may observe a virtual image 3*a* of the real specular image 3 caused by the reflective mirror 4 although the viewer can not directly see the real specular image 3. Namely the viewer can observe the virtual image 3*a* of the real specular image as a floating image behind the reflective mirror 4 (in a rear space of the reflective mirror).

FIG. 10 explains another embodiment in which a real specular image is formed on the reflective mirror.

As shown in FIG. 10, when the real specular image 3 is formed on the mirror surface of the reflective mirror, the viewer V may observe both a real specular image 3 having a finite size and a virtual image 3*a* caused by the reflective mirror 4.

Each light beam emitted from the object of view 2 passes through the dihedral corner reflector array 6 after being reflected twice by the dihedral corner reflector array 6. Then, a real image of the object of view 2 is formed as a floating image, i.e., specular image at a position symmetrical to the object of view 2 with respect to the dihedral corner reflector array 6. In the present embodiment, the reflective mirror 4 is arranged at nearly the center of the floating image. Accordingly, the viewer V sees part of the object farther from the dihedral corner reflector array 6 as the real image 3, while seeing part of the object closer to the dihedral corner reflector array 6 as the virtual image 3*a*. That is, if the reflective mirror 4 is arranged to cross the real image 3 of the object, the viewer V sees an aerial image sticking in the mirror surface of the reflective mirror 4.

As described above, by changing the arrangement of the object of view 2, the dihedral corner reflector array 6 and the reflective mirror 4 in various ways, an aerial image provided to the viewer V is formed in front of or behind the mirror surface of the reflective mirror 4, or on the mirror surface of the reflective mirror 4 (as an image sticking in the mirror surface).

In order to positively take advantage of this feature, a positional relationship thereamong may be changed with time. FIG. 11 shows a yet another embodiment in which an object of view is mechanically moved along a line connecting the object and an imaging optical system of real specular image by using a guide translation mechanism RP such as a combination of a guide rail, a motor, and a rack-and-pinion or worm-and-nut guide mechanism.

As shown in FIG. 11, an object of view 2 is attached to a sliding part that slidably travels along a guide rail G parallel to an optical axis AX so that an aerial image of the object can be moved along the sightline of a viewer V (along the optical axis AX). The object of view 2 can be moved linearly by a motor M and the guide translation mechanism RP. As an example, a real image is formed in a space between the reflective mirror 4 and the viewer V when an object of view 2*b* is far from the dihedral corner reflector array 6. In this case, the viewer V sees a real image 3 thereby formed. A real image is formed in a space between the reflective mirror 4 and the dihedral corner reflector array 6 when the object of view 2 is close to the dihedral corner reflector array 6. In this case, the viewer V sees a virtual image 3*a* formed in the reflective mirror 4. Thus, if there is used means for changing a positional relationship among the object of view, the dihedral corner reflector array 6 and the reflective mirror 4 with time, then the viewer V is allowed to see an aerial image that is continuously moved between the space behind and the space in front of the mirror surface of the reflective mirror 4.

In addition, if such a mechanism is combined with the foregoing frame pattern or under-layer pattern printed on the mirror surface of the reflective mirror 4, then the present invention enables to realize the observation images 3*a*, 3 which seem to pierce through the printed frame while moving from the far side to the near side alternatively from the near side to the far side for the viewer.

If a plurality of compact light sources (not shown) such as LEDs are arranged in line as objects of view, and are turned on sequentially to control a source of light, a viewer can see similar movement of an aerial image without necessitating actual movement of an object of view itself.

Figure 12:
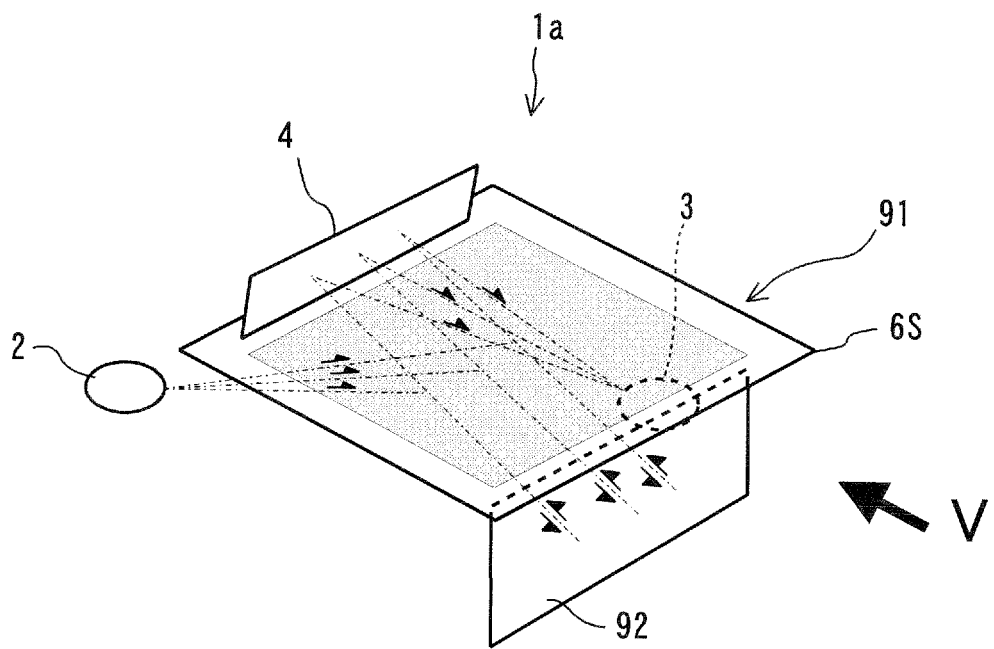
FIG. 12 is a schematic perspective view illustrating how a light beam is retro-reflected by a retroreflector array and retroreflectors applied to an imaging optical system of real specular image of another embodiment according to the present invention when viewed from a viewer.
Figure 13:
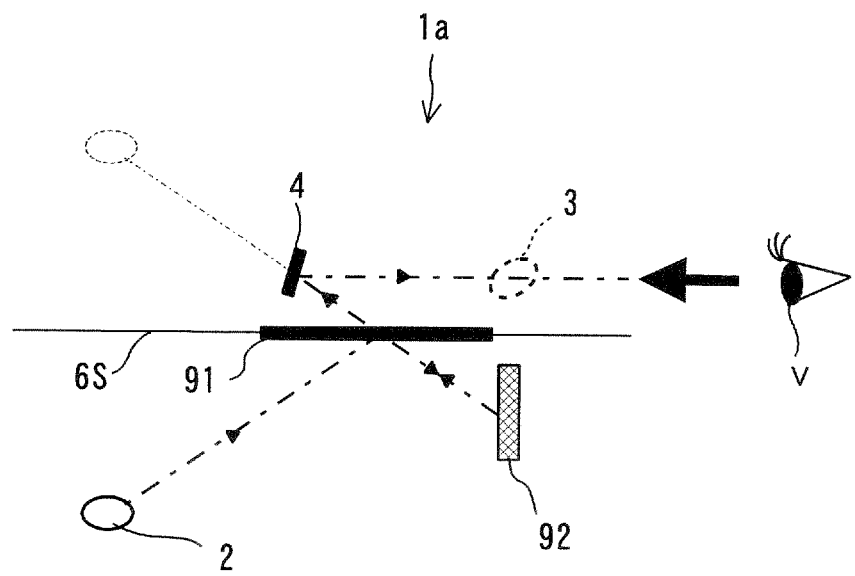
FIG. 13 is a schematic cross-sectional side view illustrating how a light beam is retro-reflected by a retroreflector array and retroreflectors applied to an imaging optical system of real specular image of another embodiment according to the present invention.

FIGS. 12 and 13 are schematic cross-sectional side views each illustrating a principal part of a display device of another embodiment to which the present invention is adapted. A display device 1*a* is different from the display device 1 of the foregoing embodiment only concerning the imaging optical system of real specular image. Therefore, there are regarded as the elements of the same names and numerals of the display device 1 have been explained. FIG. 13 schematically shows a still another embodiment of a display device to which the present invention is applied. A display device 1*a* differs only in an imaging optical system of real specular image from the display device 1 of the foregoing embodiments. Accordingly, structural elements of the display device 1*a* same as those of the display device 1 are described with the same names and the same reference numerals adapt.

An imaging optical system of real specular image 9 adapted to the present embodiment is formed by combining a half mirror 91 and a retroreflector array 92. The element surface 6S of a plane of symmetry is a mirror surface. An object of view 2 is arranged in a space opposite to a viewer V with respect to the half mirror 91. The retroreflector array 92 is also arranged in the space opposite to the viewer V. A reflective mirror 4 is arranged in a space in which the viewer V exists. Each light beam emitted from the object of view 2 is reflected by the half mirror 91, and is then guided to the retroreflector array 92. The retroreflector array 92 has a function to cause retroreflection of each light beam from the half mirror 91. Accordingly, the light beam guided to the retroreflector array 92 returns to the half mirror 91. After passing through the half mirror 91, the light beam travels to the reflective mirror 4 arranged in the space in which the viewer V exists. Next, the light beam is caused to turn back by the reflective mirror 4, so that a real image 3 is formed in a space within the sightline of the viewer V. The angle of the reflective mirror 4 is suitably set so that each light beam from the half mirror 91 can be guided toward the viewer V.

The half mirror 91 may also be made by coating one surface of a transparent thin plate made, for example, of transparent resin or glass with a thin reflective film. The opposite surface of the transparent thin plate is subjected to an anti-reflection process (i.e., AR coating), thereby preventing the real image 3 to be seen from becoming a double image. In addition, an optical film (not shown) with functions such as a visibility control film or a view angle control film may be attached onto the upper surface of the half mirror 91 as sightline control means, in which the visibility control film diffuses only light beams in certain directions and the visible angle control film cuts off only light beams in certain directions but both allow light transmission in other certain directions. Specifically, such an optical film prevents a light beam after directly passing through the half mirror 91 from reaching a place except the viewing location for the viewer V, so that an image of an object of view reflected in the reflective mirror 4 cannot be seen directly from any place except the viewing location for the viewer V through the half mirror 91. Whereas, the optical film also allows only a through-passing of light beams traveling in the direction from the retroreflector array 92 through the half mirror 91, after being reflected once by the half mirror 91 and retro-reflected by the retroreflector array 92, as described below, so that only the real image 3 can be seen from the viewing location for the viewer V.

Figure 14A:
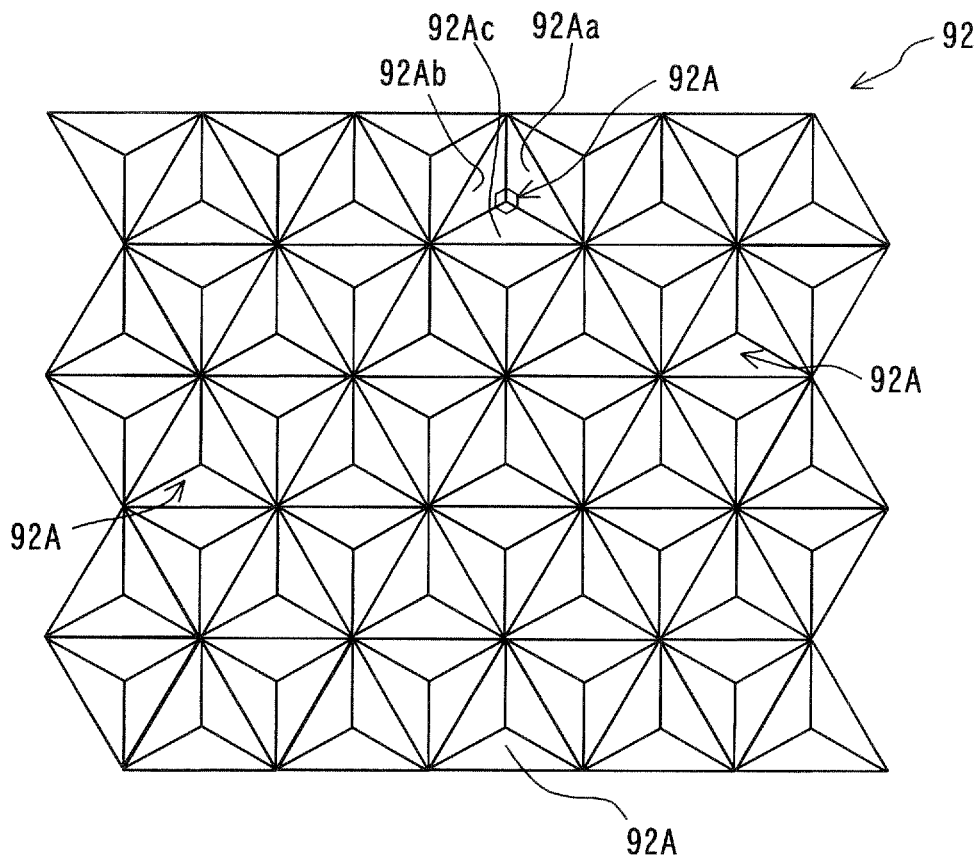
FIG. 14A is a schematic partial plan view illustrating a retroreflector array applied to the imaging optical system of real specular image.

Whereas, the retroreflector array 92 may be of any type as long as it strictly causes retroreflection of an incoming light beam. The retroreflector array 92 may be formed by applying a retroreflective material or a retroreflective coating to a material surface. Furthermore, the retroreflector array 92 may have a curved surface, or a flat surface. FIG. 14A is a front view showing part of the retroreflector array 92 in an enlarged manner. The retroreflector array 92 shown in FIG. 14A is a corner cube array as an aggregate of corner cubes each utilizing one of the internal angles of a cube. Retroreflectors 92A is a corner cube array consisting of a regulated set of corner cubes, each of which is obtained as one inner corner of a cube. Each retroreflector 92A is formed by concentrating three mirror surfaces 92Aa, 92Ab and 92Ac, in the shape of identically shaped and sized isosceles right triangles joined at a common point, showing an equilateral triangle shape when seen from the front; with those three mirror surfaces 92Aa, 92Ab and 92Ac are orthogonal to each other to form one common corner cube (FIG. 14B).

Figure 15A:
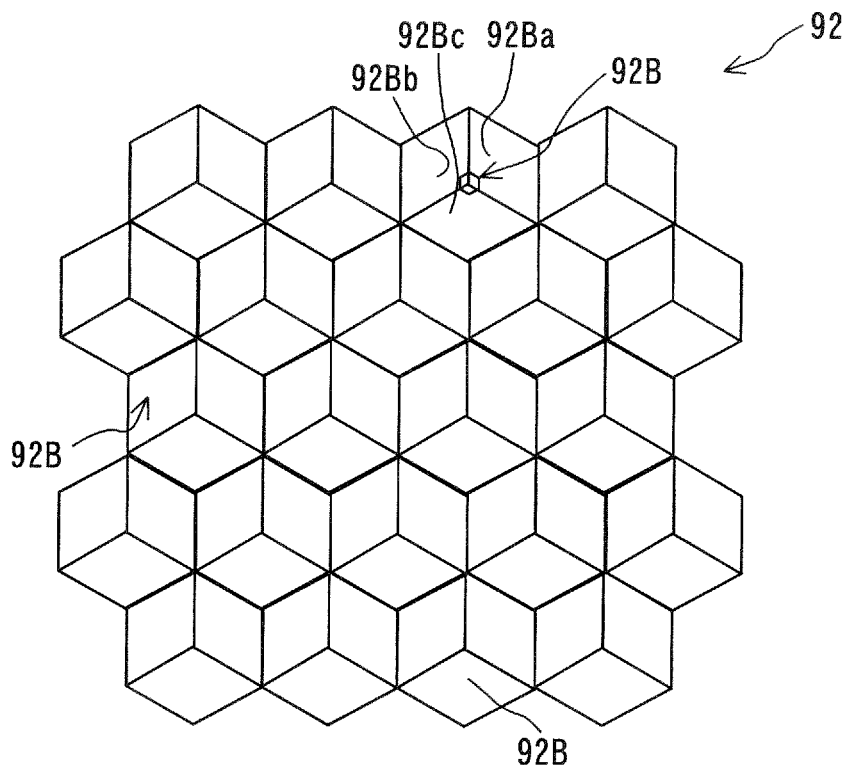
FIG. 15A is a schematic partial plan view illustrating another retroreflector array applied to the imaging optical system of real specular image.

FIG. 15A is also a front view showing part of the retroreflector array 92 in an enlarged manner. The retroreflector array 92 is also a corner cube array as a regulated aggregate of corner cubes each utilizing one of inner corners of a cube. Retroreflectors 92B each have a shape of an equilateral hexagon, when viewed from the front, formed by concentrating three mirror surfaces 92Ba, 92Bb and 92Bc in the form of squares of the same shape and the same size joined at a common point. The three mirror surfaces 92Ba, 92Bb and 92Bc are orthogonal to each other (FIG. 15B).

Figure 14B:
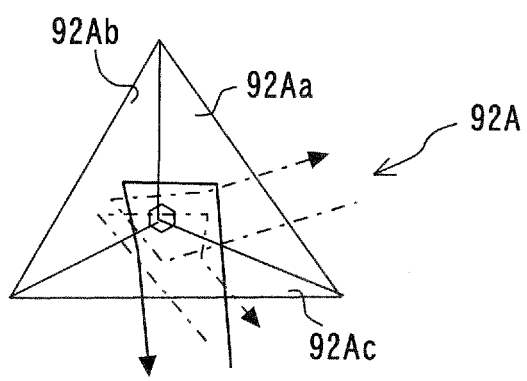
FIG. 14B is a schematic enlarged partial plan view illustrating how a light beam is retro-reflected by an exemplary retroreflector of the retroreflector array.
Figure 15B:
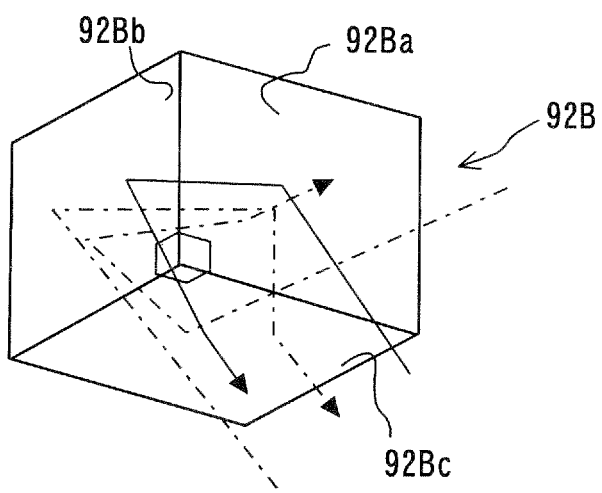
FIG. 15B is a schematic enlarged partial plan view illustrating how a light beam is retro-reflected by an exemplary retroreflector of the retroreflector array.

Although the retroreflector arrays 92 shown in FIGS. 15A and 15B are different in shape from those in FIGS. 14A and 14B, their principles of retroreflection are the same. FIGS. 14B and 15B explain the principles of retroreflection of the retroreflector arrays 92 shown in FIGS. 14A and 15A, respectively. A light beam entering one of the mirror surfaces (92Aa or 92Ba, for example) of the retroreflector 92A or 92B is sequentially reflected by a different mirror surface (92Ab or 92Bb), and by the other mirror surface (92Ac or 92Bc). Accordingly, the light beam is reflected back to a place from which it entered the retroreflector 92A or 92B. A path of a light beam entering the retroreflector array 92 and a path of a light beam exiting the retroreflector array 92 do not overlap, but in a strict sense, parallel to each other. If the retroreflector 92A or 92B is sufficiently small compared to the retroreflector array 92, paths of incident and outgoing light beams may be considered as overlapping each other. These two types of corner cube arrays differ from each other in the following. It is relatively easy to make the corner cube array with mirror surfaces in the form of isosceles triangles, but it becomes somewhat low in reflectivity. In contrast, it is relatively difficult to make the corner cube array with mirror surfaces in the form of squares, but it becomes high in reflectivity.

An alternative to the aforementioned corner cube arrays may be used as the retroreflector array 92, as long as the alternative (that is called a "corner reflector" in a broad sense) causes retroreflection of a light beam by using three mirror surfaces. While it is not shown here, for instance, an exemplary unit retroreflector to be applied in the embodiments has three mirror surfaces, two of which are orthogonal to each other, and the other is at an angle 90/N (N is an integer) degrees with respect to the other two. Another example of the unit retroreflector is an acute angle retroreflector with three mirror surfaces, where angles defined between adjacent ones of the mirror surfaces are 90, 60 and 45 degrees. A cat's eye retroreflector may also be applied as the unit retroreflector. These retroreflector arrays may be planar, curved, or warped. The location of the retroreflector array may suitably be determined, as long as a light beam emitted from an object of view and reflected by the half mirror 91 is retro-reflected by the retroreflector array.

In the display device 1a having the half mirror 91 and the retroreflector array 92, similarly in the display device 1 having a dihedral corner reflector array, a real image 3 is seen as an image floating in a space within the sightline of a viewer in a direction slanting to the mirror surface of the half mirror 91. The display device 1a can also make variations of the real image 3 by changing the position at which an image to be formed is displayed, or by changing the size of an image to be seen.

The specific structure of each constituent part of the display device may suitably be changed without departing from the purport of the present invention. As an example, the present invention is applied to a display device for making a floating image in a space in front of a display part of the display device.

INDUSTRIAL APPLICABILITY

The present invention is applicable as a display device for advertising purposes, and as an information display device for use in vehicles.

EXPLANATION OF REFERENCE NUMERALS 1,1a . . . display device
2 . . . object of view
3 . . . floating image (real specular image)
4 . . . reflective mirror
6 . . . dihedral corner reflector array (imaging optical system of real specular image)
6S . . . element surface (symmetry surface)
60 . . . substrate
61 . . . dihedral corner reflector
61a, 61b . . . mirror surface
91 . . . half mirror
91S . . . mirror surface (symmetry surface)
92 . . . retroreflector array
92A, 92B . . . Retroreflectors
92Aa, 92Ab, 92Ac, 92Ba, 92Bb, 92bc . . . mirror surfaces
CL . . . line of intersection of mirrors

The invention claimed is:

1. A display device comprising:
an imaging optical system of real specular image including a semitransparent substrate with a plane of symmetry to define an object side space in which an object of view exists and a viewer side space in which a viewer exists, wherein the imaging optical system of real specular image forms a real image of the object of view in the viewer side space with light passing through the substrate; and
a reflective mirror arranged in the viewer side space so as to reflect light beams supplied from the imaging optical system of real specular image to guide the reflected light beams toward the viewer;
wherein the reflective mirror is arranged so as to cross the real image of the object of view.

2. The display device according to claim 1, wherein the reflective mirror has at least one pattern of an under-layer pattern and a frame pattern printed.

3. The display device according to claim 1, further comprising a mechanism which changes a positional relationship among the object of view, the imaging optical system of real specular image and the reflective mirror with time.

4. The display device according to claim 3, further comprising a mechanism which moves the object of view along a line connecting the object of view and the imaging optical system of real specular image.

5. The display device according to claim 1, wherein the imaging optical system of real specular image is an optical element functioning as a dihedral corner reflector.

6. The display device according to claim 1, wherein the imaging optical system of real specular image is formed by a combination of a half mirror and a retroreflector array.

* * * * *